(12) United States Patent
Nerheim et al.

(10) Patent No.: US 10,598,775 B2
(45) Date of Patent: Mar. 24, 2020

(54) SYSTEMS AND METHODS FOR DETECTING A DISTANCE BETWEEN A CONDUCTED ELECTRICAL WEAPON AND A TARGET

(71) Applicant: Axon Enterprise, Inc., Scottsdale, AZ (US)

(72) Inventors: Magne Nerheim, Paradise Valley, AZ (US); Steven N.D. Brundula, Sedro-Woolley, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 10 days.

(21) Appl. No.: 16/003,880

(22) Filed: Jun. 8, 2018

(65) Prior Publication Data
US 2019/0271772 A1    Sep. 5, 2019

Related U.S. Application Data

(60) Provisional application No. 62/637,079, filed on Mar. 1, 2018.

(51) Int. Cl.
*G01D 5/245*    (2006.01)
*F41H 13/00*    (2006.01)
*G01S 11/12*    (2006.01)

(52) U.S. Cl.
CPC .......... *G01S 11/12* (2013.01); *F41H 13/0025* (2013.01); *G01D 5/245* (2013.01)

(58) Field of Classification Search
CPC ........ G01D 5/245; G01D 5/244; G01S 13/16; G01S 17/105; G01S 11/12; F41H 13/0025

USPC .............. 324/71.1, 178; 377/118; 434/19–23
See application file for complete search history.

(56) References Cited

U.S. PATENT DOCUMENTS

| 4,478,581 | A | * | 10/1984 | Goda | F41G 3/2683 434/22 |
| 4,561,849 | A | * | 12/1985 | Eichweber | F41J 5/02 434/22 |
| 4,574,238 | A | * | 3/1986 | Weinlich | G01P 3/685 250/222.1 |
| 7,314,007 | B2 | | 1/2008 | Su | |
| 7,631,452 | B1 | * | 12/2009 | Brundula | F41H 13/0018 42/1.08 |

(Continued)

FOREIGN PATENT DOCUMENTS

| CN | 101201230 A | 6/2008 |
| GB | 592619 | 9/1947 |

OTHER PUBLICATIONS

International Searching Authority, International Search Report and Written Opinion for International Application No. PCT/US2018/036712 dated Nov. 22, 2018.

(Continued)

*Primary Examiner* — Patrick Assouad
*Assistant Examiner* — Sean Curtis
(74) *Attorney, Agent, or Firm* — Letham Law Firm

(57) ABSTRACT

The number of pulses of a stimulus signal provided by a conducted electrical weapon ("CEW") between launch and establishing an electrical circuit with a human or animal target may be counted to determine the distance between the CEW and the target and the distance between electrodes launched by the CEW toward the target while positioned in or near target tissue.

20 Claims, 7 Drawing Sheets

(56) References Cited

U.S. PATENT DOCUMENTS

| | | | |
|---|---|---|---|
| 7,778,004 B2* | 8/2010 | Nerheim | F41A 17/063 361/232 |
| 7,800,885 B2* | 9/2010 | Brundula | F41A 17/063 361/232 |
| 7,817,253 B2* | 10/2010 | Kang | G01S 17/105 356/5.07 |
| 7,821,766 B2 | 10/2010 | Brundula | |
| 7,900,388 B2* | 3/2011 | Brundula | F41H 13/0087 42/1.08 |
| 7,944,676 B2* | 5/2011 | Smith | F41H 13/0018 361/232 |
| 7,984,579 B2 | 7/2011 | Brundula | |
| 8,356,438 B2* | 1/2013 | Brundula | F41A 17/063 42/1.08 |
| 8,756,852 B2 | 6/2014 | Kramer | |
| 8,991,085 B1 | 3/2015 | Knapp | |
| 9,010,003 B2* | 4/2015 | Brundula | F41A 17/063 361/232 |
| 9,025,304 B2* | 5/2015 | Brundula | F41H 5/24 361/232 |
| 9,228,808 B2* | 1/2016 | Brundula | F41A 17/063 |
| 9,381,372 B2 | 7/2016 | Cheatham | |
| 9,864,061 B2* | 1/2018 | Giacotto | F41G 3/06 |
| 9,897,416 B2* | 2/2018 | Zhang | F41G 3/165 |
| 2006/0256559 A1* | 11/2006 | Bitar | F41A 33/02 362/259 |
| 2007/0019358 A1* | 1/2007 | Kroll | F41H 13/0025 361/232 |
| 2007/0097592 A1* | 5/2007 | Smith | F41H 13/0025 361/232 |
| 2008/0007887 A1 | 1/2008 | Weaver | |
| 2009/0066931 A1* | 3/2009 | Kang | G01S 7/487 356/5.08 |
| 2010/0097015 A1* | 4/2010 | Knoedgen | G01D 5/24 318/135 |
| 2012/0257320 A1* | 10/2012 | Brundula | F41A 17/063 361/232 |
| 2016/0279433 A1* | 9/2016 | Cheatham, III | A61N 1/3987 |
| 2017/0241751 A1* | 8/2017 | Nerheim | F41H 13/0025 |
| 2017/0241753 A1* | 8/2017 | Nerheim | F41H 13/0025 |
| 2019/0271772 A1* | 9/2019 | Nerheim | G01S 11/12 |

OTHER PUBLICATIONS

Taiwan Patent Office, Taiwan Office Action for Taiwan Patent Application No. 107121429.

* cited by examiner

SYSTEMS AND METHODS FOR DETECTING A DISTANCE BETWEEN A CONDUCTED ELECTRICAL WEAPON AND A TARGET

BRIEF SUMMARY OF THE INVENTION

Embodiments of the present invention relate to conducted electrical weapons.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF THE INVENTION

Figure 1:
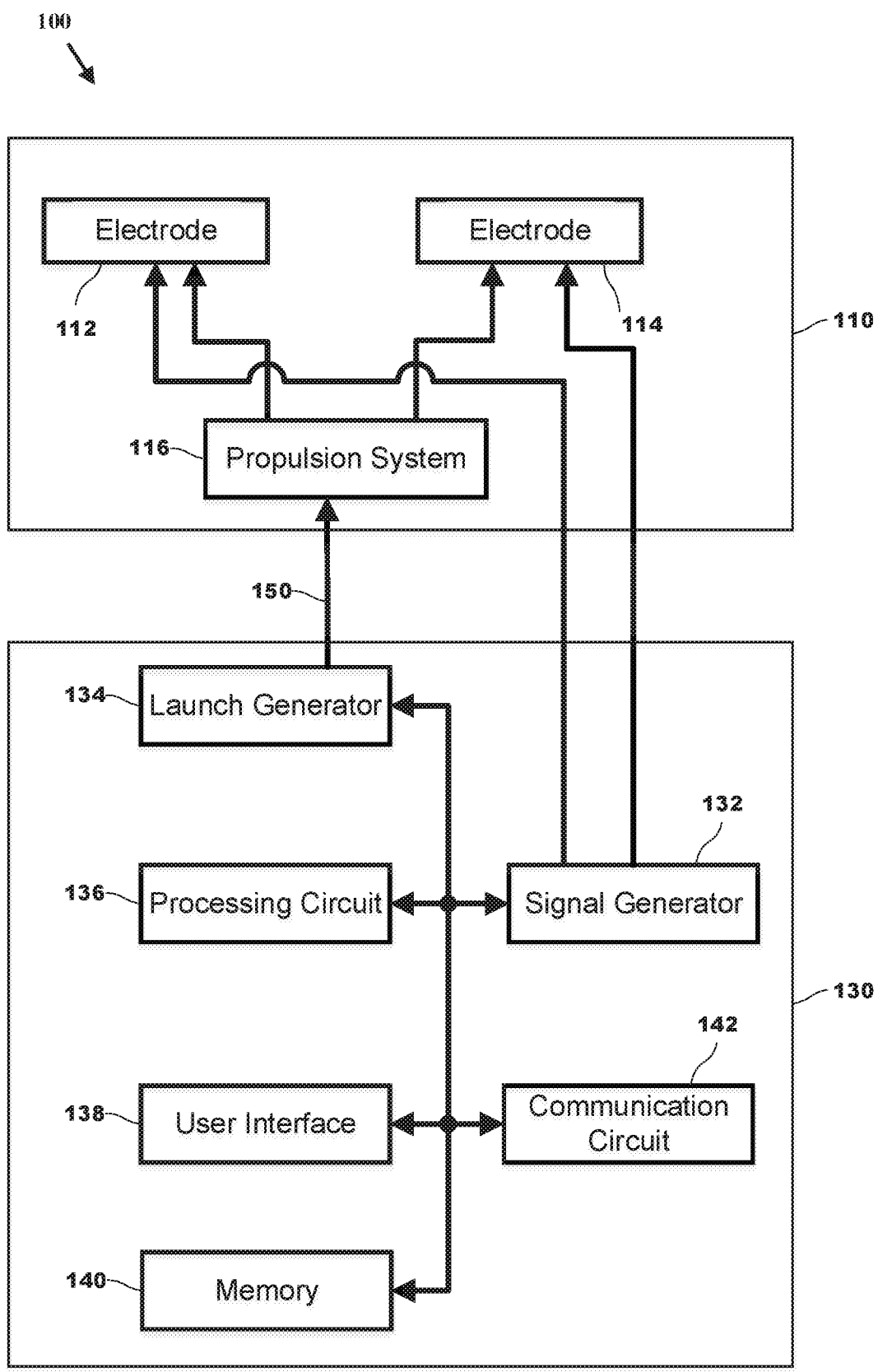
FIG. 1 is a block diagram of a portion of a deployment unit and a portion of a handle of a conducted electrical weapon ("CEW") that cooperate to detect a distance between the CEW and a target according to various aspects of the present disclosure.

A conducted electrical weapon ("CEW") is a device that provides a stimulus signal to a human or animal target to impede locomotion of the target. A CEW may include a handle and one or more removable deployment units (e.g., cartridges). A removable deployment unit inserts into a bay of the handle. An interface may electrically couple the removable deployment unit to circuitry in the handle. A deployment unit may include one or more wire-tethered electrodes (e.g., darts) that are launched by a propellant toward a target to provide the stimulus signal through the target. A stimulus signal impedes the locomotion of the target. Locomotion may be inhibited by interfering with voluntary use of skeletal muscles and/or causing pain in the target. A stimulus signal that interferes with skeletal muscles may cause the skeletal muscles to lockup (e.g., freeze, tighten, stiffen) so that the target may not voluntarily move.

A stimulus signal may include a plurality of pulses of current (e.g., current pulses, pulse). Each pulse of current delivers a current (e.g., amount of charge) at a voltage. The voltage of a pulse of current may vary over time. A pulse of a stimulus signal may include an ionization portion and a muscle portion. The voltage of the ionization portion may differ from the voltage of the muscle portion.

A voltage of the ionization portion may be of sufficient magnitude (e.g., 25,000-50,000 volts) to ionize air in a gap between an electrode and a target. A high voltage in the range of about 50,000 volts can ionize air in a gap of up to about one inch. Ionizing air in a gap between an electrode and a target establishes an ionization path between the electrode and target tissue. An ionization path has a lower impedance than the gap of air. The ionization path establishes an electrical coupling between the electrode and target tissue. An electrode will remain coupled to target tissue during the time that the air in the gap remains ionized. The air in the gap remains ionized as long as a current is provided to the target via the ionization path. When the current of the stimulus signal provided via the ionization path ceases or is reduced below a threshold, the ionization path collapses (e.g., ceases to exist) and the terminal or electrode is no longer electrically coupled to target tissue. Electrically coupling an electrode to a target electrically couples the CEW to the target.

An electrode may also electrically couple to a target via physical contact (e.g., embedded into target tissue) of the electrode with target tissue.

Once an electrode is electrically coupled to target tissue, the muscle portion of the stimulus signal may be delivered to the target. The muscle portion provides current through the target to impede locomotion of the target. The muscle portion of the stimulus signal may be delivered at a voltage (e.g., 500-5,000 volts) that is lower than the ionization portion because the electrode is electrically coupled to target tissue either by an ionization path or contact. The muscle portion of the stimulus circuit delivers electric charge through the target to impede locomotion of the target.

A stimulus signal is generated by a signal generator. The signal generator may be controlled by a processing circuit. The processing circuit may also control a launch generator. The processing circuit may receive input from a user interface, and possibly information from other sources. The user interface may be as simple as a safety switch (e.g., on/off) and a trigger that is pulled to operate the CEW. An example of information from other sources may be a signal that indicates that a deployment unit is loaded into a bay in the handle and is ready for use.

A processing circuit may send commands to the launch generator to launch one or more wire-tethered electrodes and/or engage the signal generator based on input received from the user interface or other possible sources. Upon receiving a launch command from the processing circuit, the launch generator activates the propulsion system to provide a force to launch one or more electrodes.

The electrodes may be positioned in a deployment unit. The position of an electrode in a deployment unit may establish the trajectory of launch of the electrode. In a deployment unit with one or more electrodes, the trajectory of launch for each electrode may be different. For example, the electrodes are positioned so that there is an angle of launch between the electrodes. The angle between the trajectories is set to increase the separation of the electrodes from each other in accordance with the distance that the electrodes travel away from the CEW. The further the electrodes travel to the target the greater the separation of the electrodes on the target. Increased separation of the electrodes on the target improves the effectiveness of the stimulus signal in stopping voluntary movement of the target. Separation may improve the effectiveness of the stimulus signal by increasing the amount of target tissue affected by the stimulus signal. A separation of the electrodes at the target of at least 6 inches is preferred.

Because the electrodes separate from each other in-flight, the distance between the CEW and the target provides information as to the separation of the electrodes when they reach a target. The separation between the electrodes at the target, provides information as to the possible effectiveness of the stimulus signal in stopping locomotion of the target. Accordingly, it is beneficial to know distance between the CEW and the target. The distance between the CEW and the target may be recorded (e.g., stored). Recording the distance between the CEW and the target may be useful in establishing the facts of an event. Having unbiased facts of the event may be useful in resolving conflicting testimony.

For example, CEW 100 in FIG. 1, includes deployment unit 110 and handle 130. Deployment unit 110 includes electrode 112, electrode 114, and propulsion system 116. Handle 130 includes signal generator 132, launch generator 134, processing circuit 136, user interface 138, memory 140, communication circuit 142, and launch signal 150.

A deployment unit cooperates with a handle to launch one or more wire-tethered electrodes toward a target to provide a stimulus signal to the target. A deployment unit may include a propulsion system. A propulsion system provides a force (e.g., a rapidly expanding gas) to launch the one or more wire-tethered electrodes. A deployment unit may receive a signal from a handle to launch the electrodes of the deployment unit. A propulsion system may be activated by a launch signal from the handle to launch the one or more electrodes from the deployment unit. Each electrode may be electrically coupled to a deployment unit via a wire tether (e.g., filament). A handle may provide a stimulus signal to a deployment unit, which in turn provides the stimulus signal to the one or more electrodes via the respective filaments of the electrodes. The stimulus signal may ionize air in a gap between the electrodes and/or between an electrode and a target to electrically couple the electrodes to target tissue as discussed above. The stimulus signal may include a muscle portion to impede locomotion as discussed above.

An electrode, as discussed above, couples to a wire tether and is launched toward a target to deliver a stimulus signal through the target. Movement of an electrode out of a deployment unit toward a target deploys (e.g., pulls) the wire tether so that it extends from the deployment unit (e.g., cartridge) in the handle to the electrode at the target. Launching an electrode deploys the wire tether, so that it bridges (e.g., covers, extends across) the distance between the CEW and the target. An electrode may be formed of a conductive material (e.g. metal, semiconductor) for delivery of the stimulus signal into target tissue. An electrode may include structures (e.g., spear, bars) for mechanically coupling the electrode to the target.

A signal generator generates a stimulus signal for delivery through a human or animal target to impede locomotion of the target. A signal generator may provide a stimulus signal to a target via wire-tethered electrodes. A signal generator may provide a stimulus signal between two electrodes positioned in or proximate to target tissue so that the stimulus signal conducts through target tissue. Increasing the separation of the electrodes in or on a target, increases the area of target tissue affected by the stimulus signal. Increasing the area of target tissue affected by the stimulus signal increases the likelihood that the stimulus signal may interfere with skeletal muscles of the target to cause the skeletal muscles to lock-up. Locking up the skeletal muscles of a target interferes with target locomotion. Providing the stimulus signal through target tissue to cause pain in the target interferes with target locomotion.

A stimulus signal may include a series of current pulses as discussed above. The pulses of a stimulus signal may be provided at a pulse rate. Each pulse of a stimulus signal provides an amount of electrical charge to the target. The signal generator may provide the stimulus signal at a pulse rate and amount of charge per pulse to increase a likelihood of impeding locomotion of a target. Increasing the pulse rate and/or amount of charge delivered per pulse increases the likelihood of impeding locomotion of the target by locking up the muscles of the target. A signal generator may provide a stimulus signal at a first pulse rate then a second pulse rate. One pulse rate may be better suited for detecting a distance between the CEW and a target, while another pulse rate may be better suited for impeding locomotion.

Each pulse of a stimulus signal may be provided at a voltage. A signal generator may provide a stimulus signal at a voltage of sufficient magnitude to ionize air in one or more gaps in series with the signal generator and the target as discussed above. Ionization of air in one or more gaps may electrically couple the signal generator to the target via the wire-tethered electrodes.

A pulse of a stimulus signal may include a high voltage portion (e.g., ionization portion) for ionizing air in gaps to establish electrical coupling and lower voltage portion (e.g., muscle portion) for providing current through target tissue to impede locomotion of the target as discussed above.

A signal generator includes circuits for receiving electrical energy from a source (e.g., battery) and for providing (e.g., generating) the stimulus signal. Electrical/electronic components in the circuits of a signal generator may include capacitors, resistors, inductors, spark gaps, transformers, silicon-controlled rectifiers (SCRs), and analog-to-digital converters. A processing circuit may cooperate with and/or control the circuits of a signal generator to produce a stimulus signal.

For example, activation of propulsion system 116 launches electrodes 112 and 114 toward a target. Propulsion system 116 provides an expanding gas to launch (e.g., push, propel) electrodes 112 and 114 toward a target. As electrodes 112 and 114 fly toward the target, a respective conductive filament (not shown) extends between deployment unit 110 and electrodes 112 and 114. The filaments electrically couple electrode 112 and electrode 114 to signal generator 132. Signal generator 132 provides the stimulus signal to the target via the filaments and electrodes 112 and 114. While electrode 112 and/or electrode 114 are proximate to, but not embedded in, target tissue, the stimulus signal ionizes air in gaps between electrode 112 and the target and/or electrode 114 and the target to form a circuit to deliver the stimulus signal through the target. The circuit includes a first wire tether (not shown) electrically and mechanically coupled to electrode 112, electrode 112, target tissue, electrode 114, and a second wire tether (not shown) electrically and mechanically coupled to electrode 114. Signal generator 132 electrically couples to deployment unit 110 and the first wire tether and the second wire tether to provide the stimulus signal through the circuit.

As discussed above, a propulsion system provides a force (e.g. a rapidly expanding gas) to launch electrodes toward a target. Electrodes land (e.g., impact, strike) in or near target tissue to deliver a stimulus signal through a target to impede locomotion of the target. A propulsion system may include a canister that is filled with a compressed gas. Piercing (e.g., puncturing, opening) the canister releases the gas. The rapid expansion of the gas from the canister provides a force for launching electrodes.

A handle performs the functions of a CEW and cooperates with a deployment unit to deliver a stimulus signal to a target. A handle may include a processing circuit. A processing circuit may control the operation of the components and/or circuits of a handle to perform the functions of the handle discussed herein. A handle may include a user interface for enabling activation (e.g., triggering) and control by a user. A handle may include a signal generator. A signal generator provides the pulses of current of a stimulus signal. A handle may include a source of energy for providing the stimulus signal and performing the functions of a CEW. A source of energy may include a battery. A handle may accept (e.g., receive) one or more deployment units. A handle may include one or more bays for receiving a respective deployment unit. A deployment unit may be removeable inserted into a bay of a handle for deploying one or more wire-tethered electrodes to provide the stimulus signal to a target. A handle may include a launch generator. A launch generator provides a signal for launching the electrodes of a deployment unit.

A launch generator includes a circuit that provides a launch signal. A processing circuit may control the operations of a launch generator in whole or in part. A processing circuit may instruct a launch circuit to provide a launch signal responsive to an input (e.g., trigger pull) provided by the operator of the CEW. Responsive to receiving a signal (e.g., command) from a processing circuit, a launch generator may provide a signal to one or more deployment units to initiate a launch of one or more electrodes from the deployment unit. The signal provided by a launch generator to a deployment unit to initiate launch of electrodes may be referred to as a launch signal.

A processing circuit includes any circuitry and/or electrical/electronic subsystem (e.g., component, devices) for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a computer (e.g., server), a radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, current sources, programmable logic). A processing circuit may include data buses, output ports, input ports, timers, memory, and arithmetic units.

A processing circuit may provide and/or receive electrical signals whether digital and/or analog in form. A processing circuit may provide and/or receive signals (e.g., data, information) via a bus using any protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive status information regarding the operation of other components (e.g., status, feedback). A processing circuit may perform calculations (e.g., operations) with respect to the status information. A processing circuit may provide commands (e.g., signals) to one or more other components in accordance with calculations. For example, a processing circuit may request the status of a component, analyze the status, and command components to start operation, continue operation, alter operation, suspend operation, or cease operation responsive to the status. Commands and/or status may be communicated between a processing circuit and other circuits and/or components via any type of bus including any type of data/address bus.

A handle may include a processing circuit. A processing circuit may control the operation of the components and/or circuits of a handle to perform the functions of the handle discussed herein. A processing circuit may detect input from a user interface (e.g. trigger). A processing circuit may control launch of electrodes (e.g., via a launch generator). A processing circuit may control activation of the stimulus signal (e.g., via a signal generator). A processing circuit in cooperation with other components may detect the magnitude of the voltage of a pulse of a stimulus signal. A processing circuit in cooperation with other components may detect the magnitude of the voltage of (e.g., across, on) a capacitance. A processing circuit may deduce information from the magnitude of the voltage. A processing circuit may select a pair of electrodes to deliver a stimulus signal to the target.

A processing circuit may store information in a memory regarding the operation of the handle, the operation of a deployment unit, duration of time or an event, voltage magnitudes, and/or information deduced regarding the voltage magnitudes. A processing circuit may report stored information to a server and/or a user. A processing circuit may provide information to a user via a user interface.

A memory may store information. A memory may provide previously stored information. A memory may provide previously stored information responsive to a request for information. A memory may store information in any format. A memory may store electronic digital information. A memory may provide stored data as digital information. Stored data may include a stored program for execution by a processing circuit. A memory may store information regarding the operation of the handle, the operation of a deployment unit, duration of time of an event, voltage magnitudes measured with respect to pulses of the stimulus signal, and information deduced regarding the voltage magnitudes and or duration of time of an event.

A memory includes any semiconductor, magnetic, optical technology, or combination thereof for storing information. A memory may receive information from a processing circuit for storage. A processing circuit may provide a memory a request for previously stored information. Responsive to the request, the memory may provide stored information to a processing circuit.

A memory may include any circuitry for storing program instructions (e.g., stored program) and/or data. Stored data may be organized in any manner (e.g., program code, buffer, circular buffer). Memory may be incorporated into and/or accessible by a launch generator, a signal generator, a user interface, a communication circuit, and/or a processing circuit.

A user interface enables a human user to interact with an electronic device (e.g., handle). A user may control, at least in part, an electronic device via the user interface. A user may provide information and/or commands to an electronic device via a user interface. A user may receive information (e.g., status) and/or responses from the electronic device via the user interface.

A user interface may include one or more controls that permit a user to interact and/or communicate with (e.g., provide information to) an electronic device to control (e.g., influence) the operation (e.g., functions) of the electronic device. A control includes any electromechanical device suitable for manual manipulation by a user. A control includes any electromechanical device for operation by a user to establish or break an electrical circuit. A control may include a portion of a touch screen. Operation of a control may occur by the selection of a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, a reed switch, and a key lock switch (e.g., switch lock).

A control may be operated in different manners by a user to provide different information to a processing circuit. For example, in an implementation in which the control is implemented as a push button, a user may press and release the button; press, hold the button for a period of time, then release the button during which the period of time for which the button is held determines the information conveyed to a processing circuit. The duration of time a control may be held may include a short press, a long press, and a very long press. A control may be pressed and released multiple times to convey information (e.g., double press).

The term "control", in the singular, represents a single electromechanical device for operation by a user to provide information to a device. The term "controls", in plural, represents a plurality of electromechanically devices for operation by a user to provide information to a device. The term "controls" include at least a first control and a second control. Trigger 238 may be implemented as a control.

As discussed above, a user interface may provide information to a user. A user may receive visual, haptic (e.g., tactile, kinesthetic), and/or audible information from a user interface. A user may receive visual information via devices (e.g., indicators) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA, LTE, BLE, EDGE, EV-DO) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., handle, CEW) may communicate with a communication circuit in another device (e.g., smart phone, laptop, tablet). Communications between two devices may permit the two devices to cooperate in performing a function of either device. For example, all or a portion of a user interface for a CEW may be implemented on a smart phone that includes a touch screen. User interaction with the user interface on the smart phone is communicated to the CEW via the communication circuits of the smart phone and CEW. The CEW performs the function indicated by the message from the smart phone. Any information produced by the CEW for the user is communicated from the CEW to the smart phone via the communication circuits for display on the display of the smart phone.

A communication circuit may transmit information to and/or receive information from a server. A communication circuit may transmit information stored in a memory of a CEW to a server for storage and/or analysis.

Figure 2:
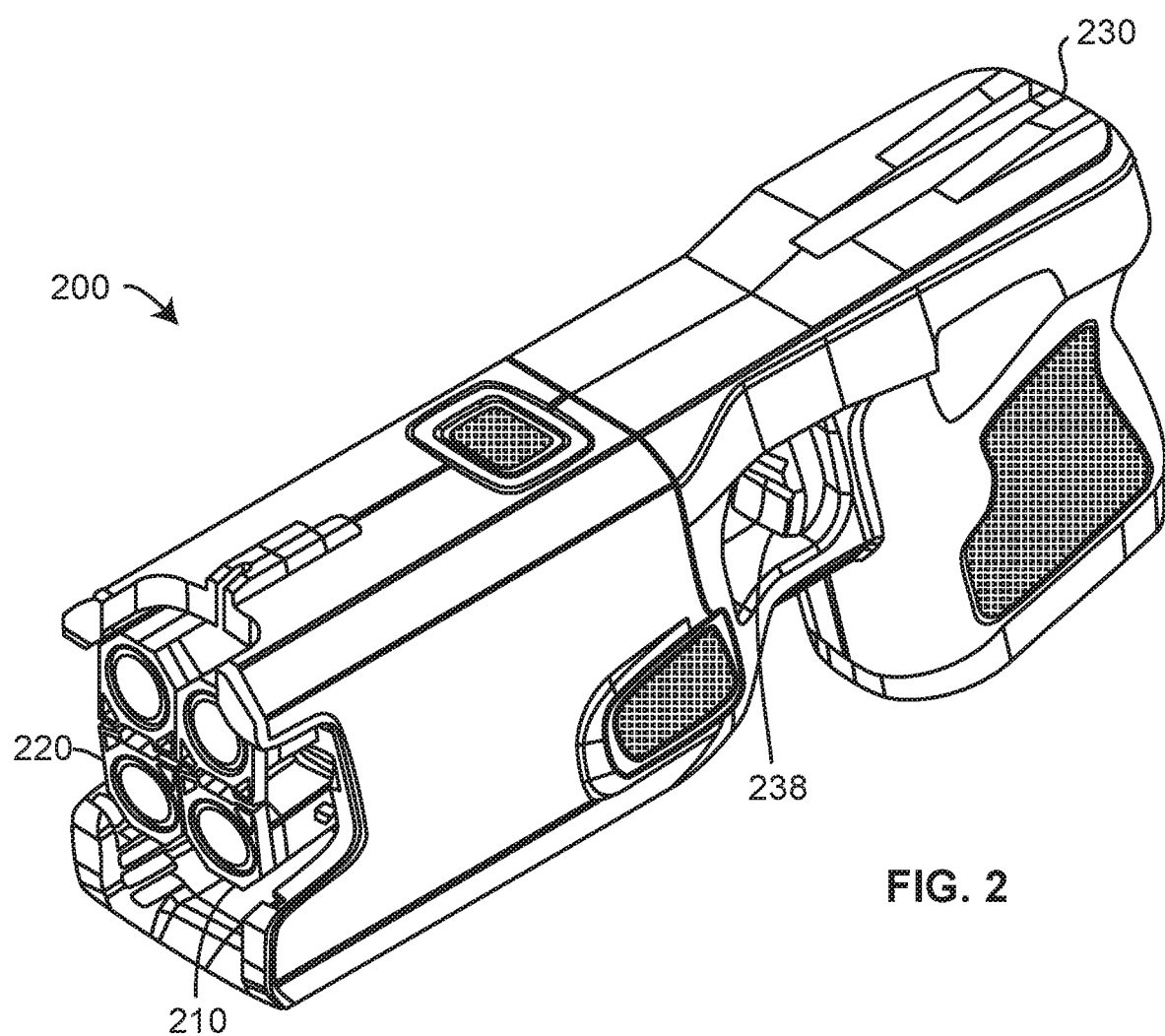
FIG. 2 is a diagram of an implementation of the CEW of FIG. 1.

CEW 200 of FIG. 2 is an implementation of CEW 100. CEW 200 in FIG. 2, includes deployment unit 210, deployment unit 220, and handle 230. Handle 230 includes trigger 238. Deployment unit 210 and 220 perform the functions of a deployment unit as discussed herein. Handle 230 performs the functions of a handle as discussed herein. Trigger 238 is part of a user interface of handle 230. Trigger 238 enables a user to initiate a launch of electrodes and provision of a stimulus signal. Trigger 238 enables a user to control, at least in part, the operations of CEW 200.

CEW 200 may include all of the components (e.g., electrodes, propulsion generator, launch generator, wire tether, signal generator, processing circuit, memory, communication circuit) of CEW 100 not specifically identified in CEW 200. CEW 200 may perform all of the functions of a CEW discussed herein.

A CEW may launch one or more wire-tethered electrodes toward a target to provide a stimulus signal to the target. The wire-tethered electrodes fly a distanced from the CEW to the target to deliver the stimulus signal to the target. Prior to launch, the electrodes are positioned in a deployment unit in close (e.g., millimeters, fractions of an inch) proximity to each other. As the electrodes fly away from the CEW toward a target, the distance between the electrodes increases because the electrodes separate from each other as they fly toward the target.

The distance between the electrodes when they reach a target is a function of the distance the electrodes travel away from the CEW. The distance between the electrodes when they strike the target determines the amount of target tissue through which the stimulus signal travels. Providing the stimulus signal through more target tissue increases the likelihood that the skeletal muscles of the target will lock-up thereby denying the target voluntary use of skeletal muscles and thereby interfering with locomotion of the target. A separation of more than six inches between the electrodes when they reach (e.g., strike) the target is preferable for increasing a likelihood of locking-up the skeletal muscles of the target. Detecting the distance the electrodes have flow from the CEW to the target provides information as to the separation of the electrodes at the target.

Figure 3:
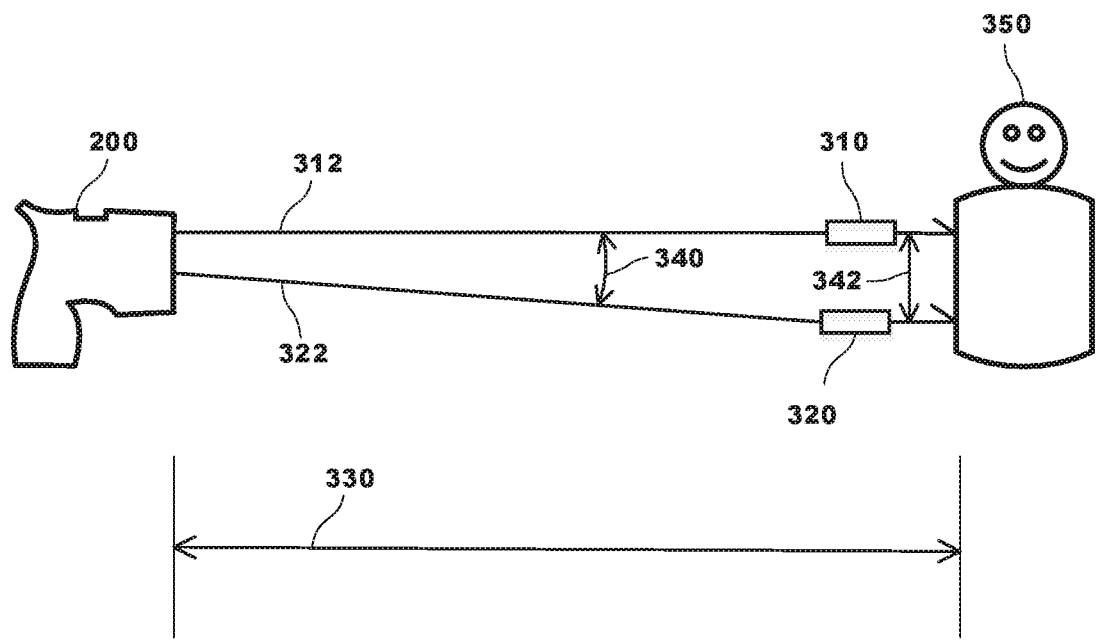
FIG. 3 is a diagram showing wire-tethered electrodes launched from a CEW and a target, the CEW and the target separated by a distance.

For example, CEW 200 in FIG. 3 has launched wire-tethered electrodes 310 and 320 toward target 350. Electrodes 310 and 320 are oriented at angle 340 relative to each other while positioned in CEW 200 prior to launch. The relative trajectories of electrodes 310 and 320 are determined by angle 340. Angle 340 causes electrodes 310 and 320 to separate from each other during flight so that electrodes 310 and 320 are separated from each other distance 342 upon reaching target 350. Electrodes 310 and 320 have traveled (e.g., flown) distance 330 from CEW 200 to target 350. Wire tethers 312 and 322 extend from CEW 200 to the electrodes positioned in or near the tissue of target 350.

Because the speed (e.g., velocity) of flight of electrodes 310 and 320 is known, distance 330 between CEW 200 and target 350 may be determined by measuring the time of flight of the electrodes between the CEW and the target. Equation 1, below, may be used to determine distance 330.

$$d = v * t \qquad \text{Equation no. 1:}$$

The distance between the CEW and the target is d (e.g., 330), the velocity of the electrodes is v, and the time of flight of the electrodes is t. A processing circuit may calculate distance 330 because velocity of flight of electrode 310 and electrode 320 is a known value. A processing circuit may determine the time of flight, t, because the processing circuit may determine (e.g., detect) the time of launch of electrodes 310 and 320 and the time when electrodes 310 and 320 have flow to target 350 and are positioned in or near target tissue.

Having determined distance 330, a processing circuit may further determine distance 342 between electrode 310 and electrode 320 at target 350 because angle 340 is also a known value.

$$s = d * \tan(a) \qquad \text{Equation no. 2:}$$

Where distance 342 between electrode 310 and electrode 320 is s, distance 330 between the CEW 200 and the target 350 is d (see equation no. 1), and angle 340 between electrode 310 and electrode 320 is a. The processing circuit may calculate separation s (e.g., 342) because angle 340 is a known value for a deployment unit and distance 330 may be determined in accordance with equation no. 1 above.

As discussed above, the pulses of a stimulus signal may be provided at different rates. For example, the pulses of a stimulus signal may be provided at a first rate followed by a second rate. A stimulus signal with a higher (e.g., faster) pulse rate may improve the accuracy of measuring the time of flight of the electrodes 310 and 320 from CEW 200 to target 350. Providing a stimulus signal at a higher pulse rate, at least for a predetermined period of time after launch, improves the accuracy of calculating distance 330 between CEW 200 and target 350.

Pulses of a stimulus signal that are provided at a higher pulse rate may be provided at a lower voltage than pulses provided at a lower pulse rate. Providing pulses at a lower voltage may facilitate providing the pulses at a higher pulse rate (e.g., greater frequency).

A stimulus signal that has pulses provided at a lower voltage, even though provided at a higher pulse rate, may not provide the same amount of charge as a stimulus signal that has pulses provided at a higher voltage and a lower pulse rate. A stimulus signal provided at a higher voltage, even though provided at a lower pulse rate, may increase the likelihood that the stimulus signal interferes with locomotion of a target by locking up the muscles of the target. So, a stimulus signal with a first pulse rate that is faster and a second pulse rate that is slower may improve the measurement accuracy of the time of flight of the electrodes during the period of the faster pulse and impede locomotion of a target during the period of the slower pulse rate.

Figure 4:
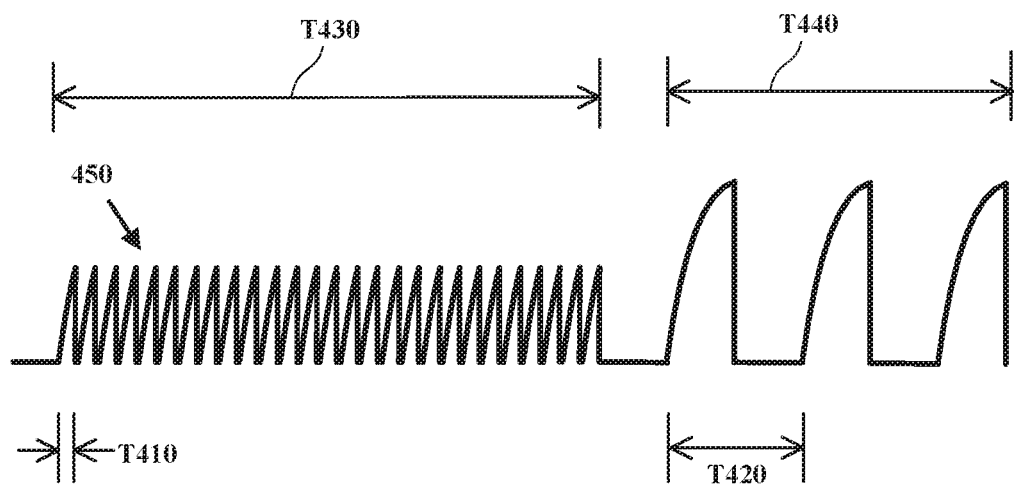
FIG. 4 is a diagram of a series of pulses of current of a stimulus signal generated by the CEW.

For example, stimulus signal 450 of FIG. 4 includes pulses during time T430 that are delivered at a first rate and a lower voltage followed by pulses during time T440 that are delivered at a second rate and a higher voltage. The pulses of time T430 have period T410. The pulses of time T440 have period T420. Time T410 is less than time T420.

A processing circuit may begin measuring the time of flight of electrodes 310 and 320 from CEW 200 toward target 350 beginning at the time when the launch signal is sent to the deployment unit to launch electrodes 310 and 320. When the processing circuit detects that electrodes 310 and 320 have electrically coupled to target 350 and are providing the stimulus signal through target 350, the processing circuit may stop measuring time the time of flight because the flight of the electrodes has ended and they are positioned at target 350. The duration of time between launch of electrodes 310 and 320 and detecting an electrical coupling represents the time of flight.

One method for a processing circuit to measure the time of flight is to count the number of pulses of the stimulus signal between providing the launch signal and detecting a circuit with the target. Because the pulses of the stimulus signal are provided at regular intervals, each pulse represents a distance flown (e.g., covered, traveled) by the electrodes. A faster pulse rate means that there is less time between pulses and therefore less distance traveled for each pulse counted. As the pulse rate increases, the accuracy of number of pulses counted to the distance from CEW 200 to target 350 increases.

For example, Table 1 below provides two different pulse rates of a stimulus signal and the corresponding of distance traveled by an electrode for a pulse of the stimulus signal.

| Pulse rate (pulses per second) | Velocity of Dart (feet per second) | Resolution (feet per pulse) |
| --- | --- | --- |
| 22 | 120 | 5.5 |
| 200 | 120 | 0.6 |

As can be seen from Table 1, a faster pulse rate increases the resolution of measuring distance between the CEW and the target because as the pulse rate increases, the electrode travels less distance between each pulse. At 22 pulses per second, the accuracy of counting pulses to determine distance of flight is accurate to about +/−5.5 feet. Whereas at 200 pulses per second, the accuracy of counting pulses to determine distance of flight is +/−0.6 feet.

For example, if target 350 is positioned 8 feet away from CEW 200, processing circuit 136 will count one pulse at 22 pulses per second before electrodes 310 and 320 reach target 350. The distance of flight may be determined to be somewhere between 5.5 feet and 11 feet. However, if the pulses of the stimulus signal are provided at 200 pulses per second, the processing circuit will count 13 pulses before electrodes 310 and 320 reach target 350, so the distance of flight, distance 330, can be determined to be somewhere between 7.8 feet and 8.4 feet.

Figure 5:
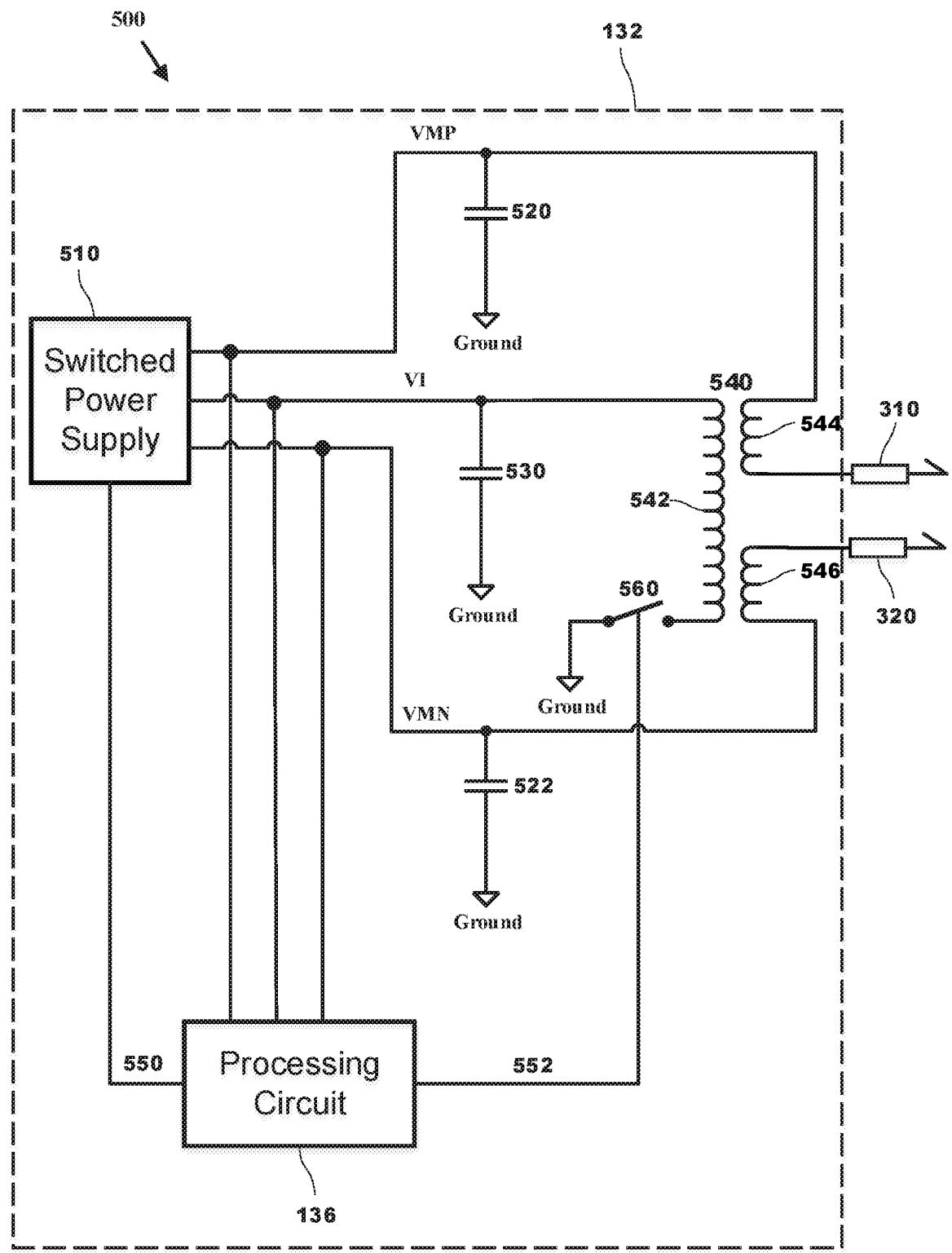
FIG. 5 is a diagram of a circuit of a CEW for providing a stimulus signal and detecting the distance between the CEW and a target.

Circuit 500 of FIG. 5 is an implementation of a circuit that provides a stimulus signal at different rates and counts the number of pulses between launch and providing the stimulus signal through a target.

Circuit 500 includes signal generator 132, electrode 310, electrode 320, and processing circuit 136. Signal generator 132 includes switched power supply 510, capacitance 520, capacitance 522, capacitance 530, transformer 540, control signal 550, control signal 552, and switch 560. Transformer 540 includes primary winding 542, secondary winding 544, and secondary winding 546.

Capacitance 520 may be referred to as the positive muscle capacitance. Capacitance 522 may be referred to as the negative muscle capacitance. Capacitance 530 may be referred to as the ionization capacitance. A muscle capacitance may cooperate with other circuits to provide the muscle portion of a stimulus signal. An ionization capacitance may cooperate with other circuits to provide the ionization portion of a stimulus signal.

Transformer 540 may be referred to as a high voltage transformer. The secondary winding of transformer 540 may provide a voltage in the range of 25,000-50,000 volts. Switch 560 may be referred to as an ionization discharge switch.

A capacitance may include any active and/or passive component that stores a charge and provides a charge. A capacitance includes a capacitor.

A control signal may include one or more signals. A control signal may be provided over a bus that includes one or more conductors.

Processing circuit 136 controls signal generator 132 and switched power supply 510 to provide a stimulus signal. Processing circuit 136 controls signal generator 132 and switched power supply 510 to provide each pulse of a stimulus signal. To provide a pulse of a stimulus signal, processing circuit 136 controls switched power supply 510 to charge capacitances 520, 522, and 530. Once capacitances 520, 522, and 530 are charged, processing circuit 136 closes switch 560 to discharge capacitance 530 into primary winding 542 of transformer 540. Responsive to the discharge of capacitance 530 into primary winding 542, transformer 540 steps up the voltage applied to the primary to produce a higher voltage across secondary windings 544 and 546 and thereby across (e.g., between) electrodes 310 and 320.

If a circuit is established, by electrodes 310 and 320 through a target, capacitances 520 and 522 discharge into the target via secondary winding 544 and secondary winding 546, and electrode 310 and electrode 320 respectively. Capacitances 520 and 522 discharged when a circuit is established by electrodes 310 and 320 through a target, so the discharge of capacitances 520 and 522 is a sign that electrodes 310 and 320 have electrically coupled to a target. The voltage across capacitances 520 and 522 may be monitored to detect when electrodes 310 and 320 discharge and thereby detect when electrodes 310 and 320 have reached a target.

Each pulse generated by signal generator 132 begins by discharging capacitance 530 into primary winding 542. Processing circuit 136 controls the charging of capacitance 530 by controlling switched power supply 510. Processing circuit 136 controls the discharge of capacitance 530 by controlling switch 560. Processing circuit 136 also controls sending a launch signal to a deployment unit to launch electrodes from the deployment unit toward a target. Processing circuit 136 may also monitor the voltage across capacitances 520 and 522.

As a result of the controlling and the monitoring discussed above, processing circuit 136 knows when the electrodes have been launched, may count the number of pulses of the stimulus signal provided after launch, may detect when and if electrodes 310 and 320 establish a circuit through a target, and determine the number of pulses of the stimulus signal provided between launch and reaching the target. Processing circuit 136 may also be programmed with the information to calculate the distance between the CEW and a target in accordance with the number of pulses provided between launch and reaching a target as discussed above. Further, processing circuit 136 may calculate distance 342 between electrode 310 and electrode 320 at the target in accordance with the distance electrodes 310, or electrode 320, traveled to reach the target.

Figure 6:
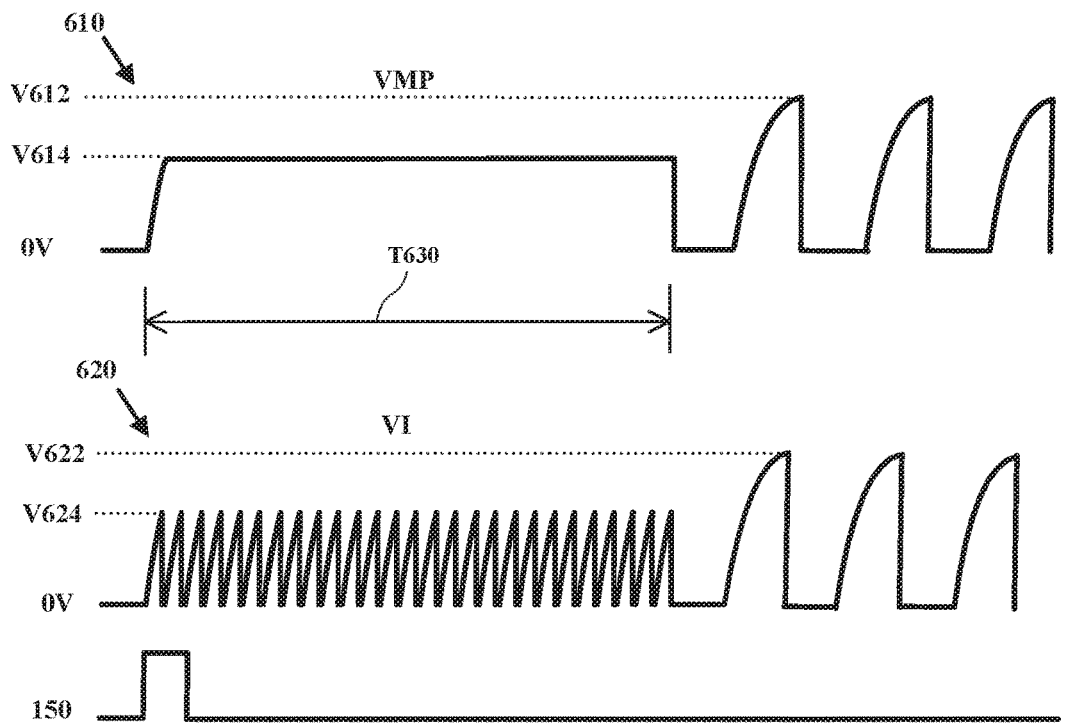
FIG. 6 is a diagram of the electrical signals of the circuit of the CEW of FIG. 5 for detecting the distance between the CEW and the target.
Figure 7:
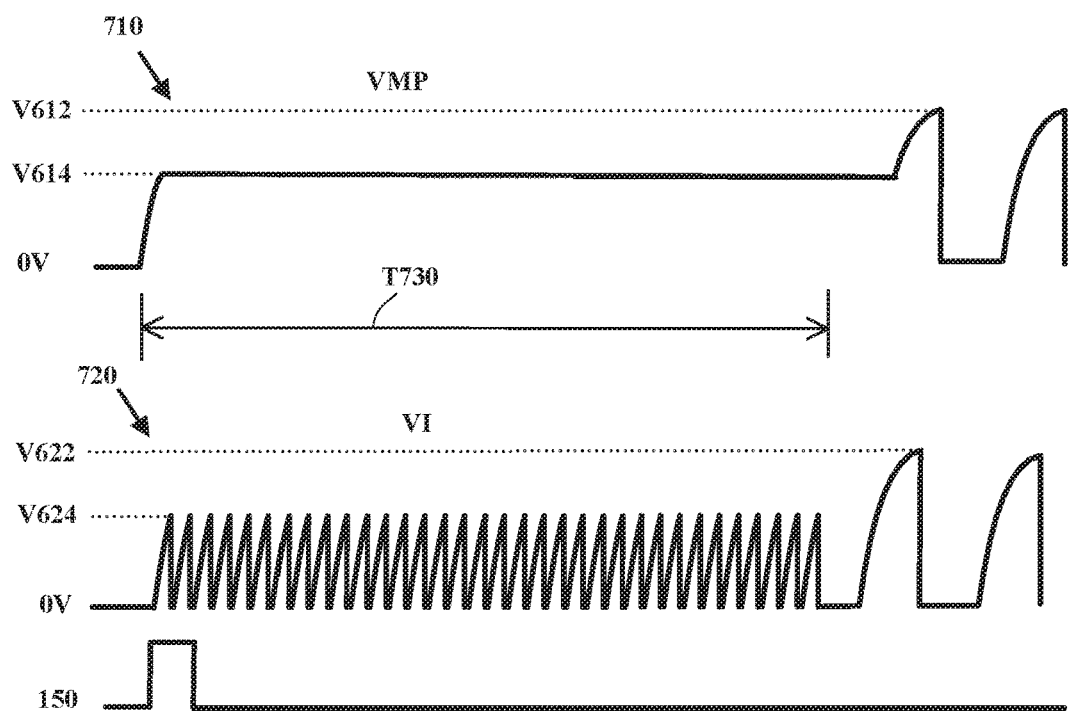
FIG. 7 is another diagram of the electrical signals of the circuit of the CEW of FIG. 5.
Figure 8:
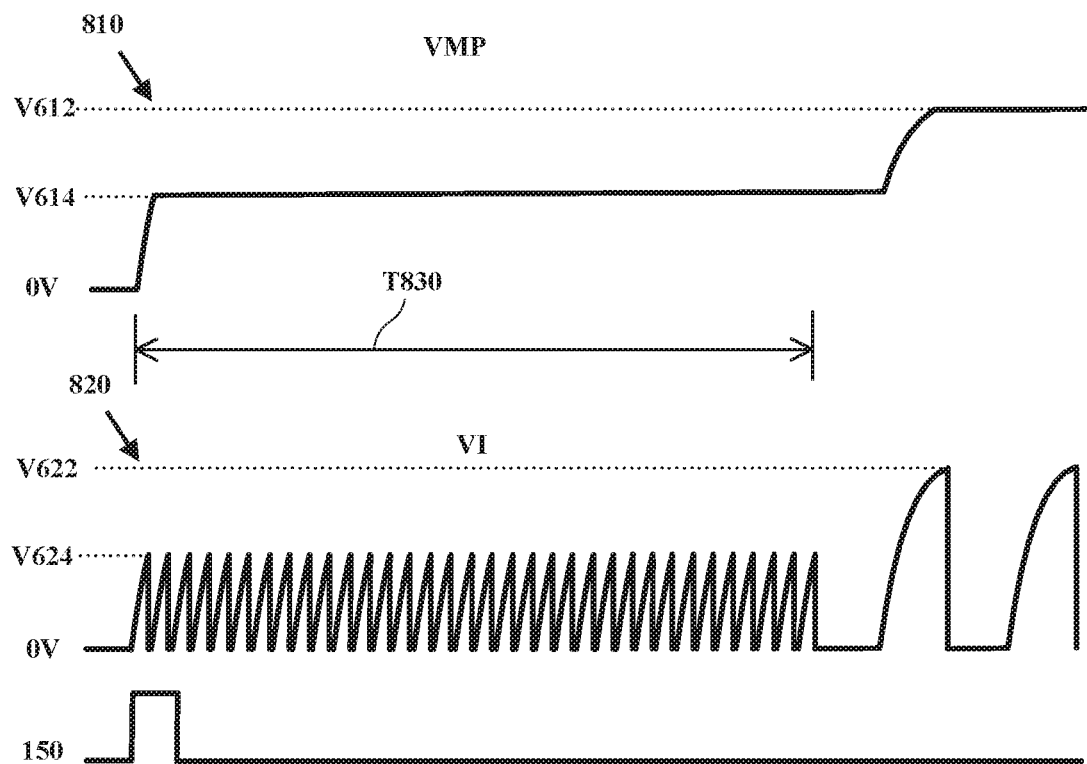
FIG. 8 is another diagram of the electrical signals of the circuit of the CEW of FIG. 5.
Figure 9:
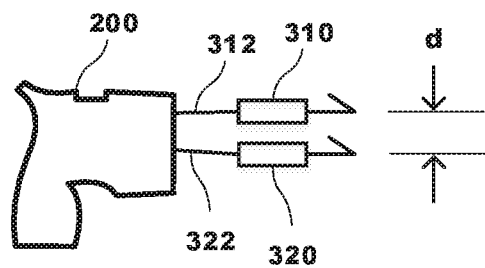
FIG. 9 is a diagram showing a CEW and a separation of the wire-tethered electrodes shortly after launch of the electrodes.

Referring to FIGS. 6-8, processing circuit 136 in cooperation with switched power supply 510 and signal generator 132, may produce pulses of the stimulus signal at a higher rate and lower voltage to aid in determining the distance between the CEW and a target, followed by pulses of the stimulus signal at a lower rate and higher voltage to aid in impeding locomotion of the target. Processing circuit 136 may count pulses of current at the higher rate to determine distance and detect the discharge of capacitances 520 and 522 to detect a circuit through a target via electrodes 310 and 320 as discussed above.

The waveforms of FIGS. 6-8 show the operation of circuit 500 under three different conditions. In FIG. 6, circuit 500 charges and discharges capacitance 530 at higher pulse rate and lower voltage until circuit 500 detect the discharge of capacitance 520, or capacitance 522, which occurs when electrodes 310 and 320 have electrically coupled with a target. After circuit 500 detects that electrodes 310 and 320 have electrically coupled to the target, circuit 500 provides pulses of the stimulus signal at a lower pulse rate and higher voltage.

In FIG. 7, electrodes 310 and 320 do not electrically couple with target 350, so capacitances 520 and 522 do not discharge. Because capacitances 520 and 522 do not discharge, circuit 500 does not detect that electrodes 310 and 320 have electrically coupled to a target, so circuit 500 charges and discharges capacitance 530 at a higher pulse rate and lower voltage for a predetermined amount of time before providing pulses of the stimulus signal at a lower pulse rate and higher voltage. In FIG. 7, once the stimulus signal is provided at the higher voltage, the higher voltage ionizes air in a gap between electrodes 310 and 320 and the target to electrically couple to circuit 500 to target 350.

The waveforms of FIG. 8 show the operation of circuit 500 when electrodes 310 and 320 completely fail to electrically couple to a target. In FIG. 8, circuit 500 does not detect that electrodes 310 and 320 have electrically coupled to a target, so circuit 500 charges and discharges capacitance 530 at higher pulse rate and lower voltage for a predetermined amount of time before providing pulses of the stimulus signal at a lower pulse rate and higher voltage. However, unlike in FIG. 7, in FIG. 8 once the stimulus signal is provided at the higher voltage the higher voltage does not result in an electrical coupling of electrodes 310 and 320 to the target.

The waveforms of FIGS. 6-8 are discuss in more detail below.

Referring to FIG. 6, processing circuit 136 may produce pulses of the stimulus signal at a higher rate until processing circuit 136 detects that electrodes 310 and 320 have electrical coupled to (e.g., established a circuit with) a target.

Signal 610 is the voltage at node VMP in FIG. 5, which is the voltage across capacitance 520. The voltage across node VMN, not shown, is similar, but of an opposite polarity. Signal 620 is the voltage at node VI in FIG. 5, which is the voltage across capacitance 530. Signal 150 is the launch signal. Prior to launching electrodes 310 and 320, processing circuit 136 charges capacitance 520 to voltage V614 and capacitance 530 to voltage V624. Processing circuit 136 provides launch signal 150 (e.g., a pulse) to launch electrodes 310 and 320 toward target 350. Because processing circuit 136 provides launch signal 150, processing circuit 136 knows that the process for launching electrodes 310 and 320 has begun, so processing circuit 136 may begin counting the number of times pulses are formed in (e.g., provided by) signal 620.

Processing circuit 136 controls providing pulses of signal 620 at the higher pulse rate by repeatedly charging capacitance 530 and discharging capacitance 530 into primary winding 542 of transformer 540. Each time capacitance 530 is charged and discharged, a pulse of signal 620 is provided.

Processing circuit 136 controls the discharge of capacitance 530 because processing circuit 136 controls switch 560.

Charging capacitance 530 to a voltage of magnitude V624 requires less time than charging capacitance 530 to a voltage of magnitude V622 since V624 is a lower magnitude than V622. Likewise, charging capacitance 520 to a voltage of magnitude V614 requires less time than charging capacitance 520 to a voltage of magnitude V612 since V614 is a lower magnitude than V612.

From the time of launch, at the start of time T630, processing circuit 136 controls the charging and discharge of capacitance 530 to form pulses of signal 620 at a first rate. Processing circuit 136 counts the number of times capacitance 530 is charged and discharge. When electrodes 310 and 320 establish an electrical circuit with the target, the voltage across capacitance 520, and the voltage (not shown) across capacitance 522, decreases as capacitance 520 and capacitance 522 discharge through the target. Processing circuit 136 detects the discharge of capacitance 520 and capacitance 522. The discharge of capacitance 520 and capacitance 522 indicates the end of the time of flight of electrodes 310 and 320. The discharge of capacitance 520 and capacitance 522 indicates that a circuit has been established with the target. Processing circuit 136 may determine the time of flight of electrodes 310 and 320 to the target by the number of pulses of signal 620 during period T630 (e.g., time from launch to discharge of capacitance 520).

Once processing circuit 136 detects discharge of capacitance 520, processing circuit 136 may decrease the pulse rate of signal 620 and increase the magnitude of the voltages V612 and V622 across capacitance 520 (and capacitance 522) and 530 respectively to provide signals 610 and 620 at a second rate. Signals 610 and 620 are provided through the circuit into target tissue as a stimulus signals as discussed above. Signal 620 provides the high voltage portion of the stimulus signal for ionizing air in gaps to establish electrical coupling between the electrodes and the target. Signal 610 provides the lower voltage portion of the stimulus signal through target tissue to impede locomotion of the target. The stimulus signal is the combination of signal 610 and signal 620.

Discuss only briefly above, the operation of capacitance 522 is analogous to the operation of capacitance 520 and signal 610 except that the polarity of the voltage across capacitance 522 is the opposite of the polarity of the voltage across capacitance 520 so that the voltage provided by capacitances 520 and 522 to target tissue is double the absolute value of the magnitude of the voltage of signal 610.

In the event that electrodes 310 and 320 do not electrically couple to a target, capacitance 520, and 522, will not discharge, so processing circuit 136 does not detect a circuit with a target. As shown in FIG. 6, above, when processing circuit 136 detects that electrodes 310 and 320 have coupled to a target, processing circuit 136 shifts from providing pulses at a higher rate to a lower rate. After the predetermined period of time if no connection with a target is detected, processing circuit 136 may produce pulses of the stimulus signal at a lower rate and a higher magnitude of voltage. Even though the pulse of the stimulus signal provided at the lower voltage could not establish a circuit with the target, once the predetermined period time elapses and the pulses of the stimulus signal are provided at the higher voltage, the higher voltage may establish a circuit through the target by ionizing air in a gap between the electrodes and the target.

With respect to the signals shown in FIG. 7, processing circuit 136 provides pulses of the stimulus signal at a higher rate and lower voltage for a predetermined period of time. After the predetermine period of time, because processing circuit has not detected the discharge of capacitance 520, processing circuit 136 provides pulses at a lower rate and higher voltage. As discussed above, the pulses of the stimulus signal provided at the lower rate and higher voltage may ionize air in a gap between electrodes 310 and 320 and the target to establish a circuit between electrodes 310 and 320 and target tissue.

Signal 710 is the voltage at node VMP in FIG. 5, which is the voltage across capacitance 520. Signal 720 is the voltage at node VI in FIG. 5, which is the voltage across capacitance 530. Signal 150 is the launch signal. Prior to launching electrodes 310 and 320, processing circuit 136 charges capacitance 520 to voltage V614 and capacitance 530 to voltage V624. Processing circuit 136 provides launch signal 150 to launch electrodes 310 and 320 toward target 350. Processing circuit 136 begins to count the number of times pulses are formed in signal 720.

Processing circuit 136 controls providing pulses of signal 720 at the higher pulse rate by repeatedly charging capacitance 530 and discharging capacitance 530 into primary winding 542 of transformer 540. Each time capacitance 530 is charged and discharged, a pulse of signal 720 is provided. Processing circuit 136 controls the discharge of capacitance 530. Processing circuit 136 discharges capacitance 530 by closing switch 560.

Because processing circuit 136 does not detect a decrease in the voltage across capacitance 520 (e.g., discharge of capacitance 520), processing circuit provides pules of the stimulus voltage at the higher pulse rate and lower voltage for the predetermined period of time T730. It may be possible that electrodes 310 and 320 are proximate to target tissue, but separated from target tissue by a gap of air that too long for the lower magnitude of the voltage to ionize the air in the gap to establish a circuit with the target.

After the period of time T730, processing circuit 136 provides pulses of signal 720 at a lower pulse rate and a higher voltage. Once the pulses of signal 720 are provided at the higher voltage, the magnitude of the voltage may be high enough to ionize air in a gap between electrodes 310 and 320 to establish a circuit with the target.

As discussed above, before processing circuit 136 provides launch signal 150, processing circuit 136 charges capacitance 520 and 530. From the time of launch, at the start of time T730, processing circuit 136 controls the charging and discharge of capacitance 530 to form pulses of signal 620 at a first rate. Because a circuit is not established with a target at the lower voltage and higher pulse rate, processing circuit 136 does not detect discharge of capacitance 520 during the period of time T730. After the period of time T730, processing circuit 136 decreases the pulse rate of signal 720, increases the magnitude of the voltage of signal 720 from V624 to V622, and increases the voltage of signal 710 from V614 to V612. Processing circuit 136 then provides signals 710 and 720 at the higher voltage and signal 720 at a second rate, that is lower than the first rate.

Signals 710 and 720 are provided through the circuit into target tissue as a stimulus signal as discussed above. When electrodes 310 and 320 establish an electrical circuit with the target, capacitance 520, and capacitance 522, discharge through the target. In this case, the discharge of capacitance 520 does not indicate the end of the time of flight of electrodes 310 and 320 as above, so processing circuit 136 may not determine the time of flight of electrodes 310 and 320 to the target. Period of time T730 is the maximum amount of time allotted for flight and establishing a circuit with a target. When period of time 730 lapses without processing circuit 136 detecting the discharge of capacitance 520, processing circuit cannot determine a time of flight of electrodes 310 and 320 or the distance from the CEW to the target.

Signals 710 and 720 are provided through the circuit into target tissue as a stimulus signals as discussed above. Signal 720 provides the high voltage portion of the stimulus signal for ionizing air in gaps to establish electrical coupling between the electrodes and the target. Signal 710 provides the lower voltage portion of the stimulus signal through target tissue to impede locomotion of the target. The stimulus signal is the combination of signal 710 and signal 720.

Not discussed above is capacitance 522 and the voltage across capacitance 522. The operation of capacitance 522 is analogous to the operation of capacitance 520 and signal 710 except that the polarity of the voltage across capacitance 522 is the opposite of the polarity of the voltage across capacitance 520 so that the voltage provided by capacitances 520 and 522 to target tissue is double the absolute value of the magnitude of the voltage of signal 710.

The signals shown in FIG. 8 occur when the electrodes do not establish an electrical connection with the target. Similar to signal 710 in FIG. 7, processing circuit 136 charges capacitance 520 and monitors the voltage across capacitance 520 to detect formation of a circuit through a target. In FIG. 8, processing circuit 136 forms signal 820 as pulses at a higher pulse rate and lower voltage for the predetermined time T730 without detecting a decrease in the voltage across capacitance 520, which means that the electrodes have not formed a circuit with the target.

After the laps of period T730, processing circuit 136 provides pulses of signal 820 at a lower pulse rate and a higher voltage. However, in this case, electrodes 310 and 320 have not formed a circuit through the target or a short circuit with each other, so providing signal 820 at the higher pulse rate and higher voltage will not establish, even by ionization, a circuit through the target. In this example, pulses of a stimulus signal at a higher voltage will not ionize air in a gap between electrode 310 or electrode 320 and target tissue, so no circuit is formed through the target.

In this case the end of the time of flight of electrodes 310 and 320 cannot be determined by processing circuit 136, so processing circuit 136 cannot determine the time of flight of electrodes 310 and 320 to the target.

Not discussed above is capacitance 522 and the voltage across capacitance 522. The operation of capacitance 522 is analogous to the operation of capacitance 520 and signal 810 except that the polarity of the voltage across capacitance 522 is the opposite of the polarity of the voltage across capacitance 520 so that the voltage provided by capacitances 520 and 522 to target tissue is double the absolute value of the magnitude of the voltage of signal 810.

While electrodes 310 and 320 are positioned in a deployment unit prior to launch, they are positioned close (e.g., within an inch) of each other; however, the deployment unit housing is positioned between electrode 310 and electrode 320. As electrodes 310 and 320 exit the deployment unit at launch, they are still close to each other with a gap of air between them. If the voltage level (e.g., V624) of the higher pulse rate, lower voltage signal is high enough to ionize air in the gap between the electrodes 310 and 320, capacitance 520, and 522, may be discharged long before electrodes 310 and 320 reach the target.

In the event that capacitance 520, and capacitance 522, is discharged shortly after launch, processing circuit 136 may attribute the discharge to the proximity of electrode 310 to electrode 320 and not to the proximity of electrodes 310 and 320 to the target or a circuit through the target. Processing circuit may merely recharge capacitance 520, and capacitance 522, and continue counting pulses.

Any premature discharge of capacitance 520, and 522, likely will occur only shortly after launch of electrodes 310 and 320 because as electrodes 310 and 320 travel toward the target, they separate from each other thereby reducing the likelihood that higher pulse rate, lower voltage pulses will travel between electrodes 310 and 320.

Figure 10:
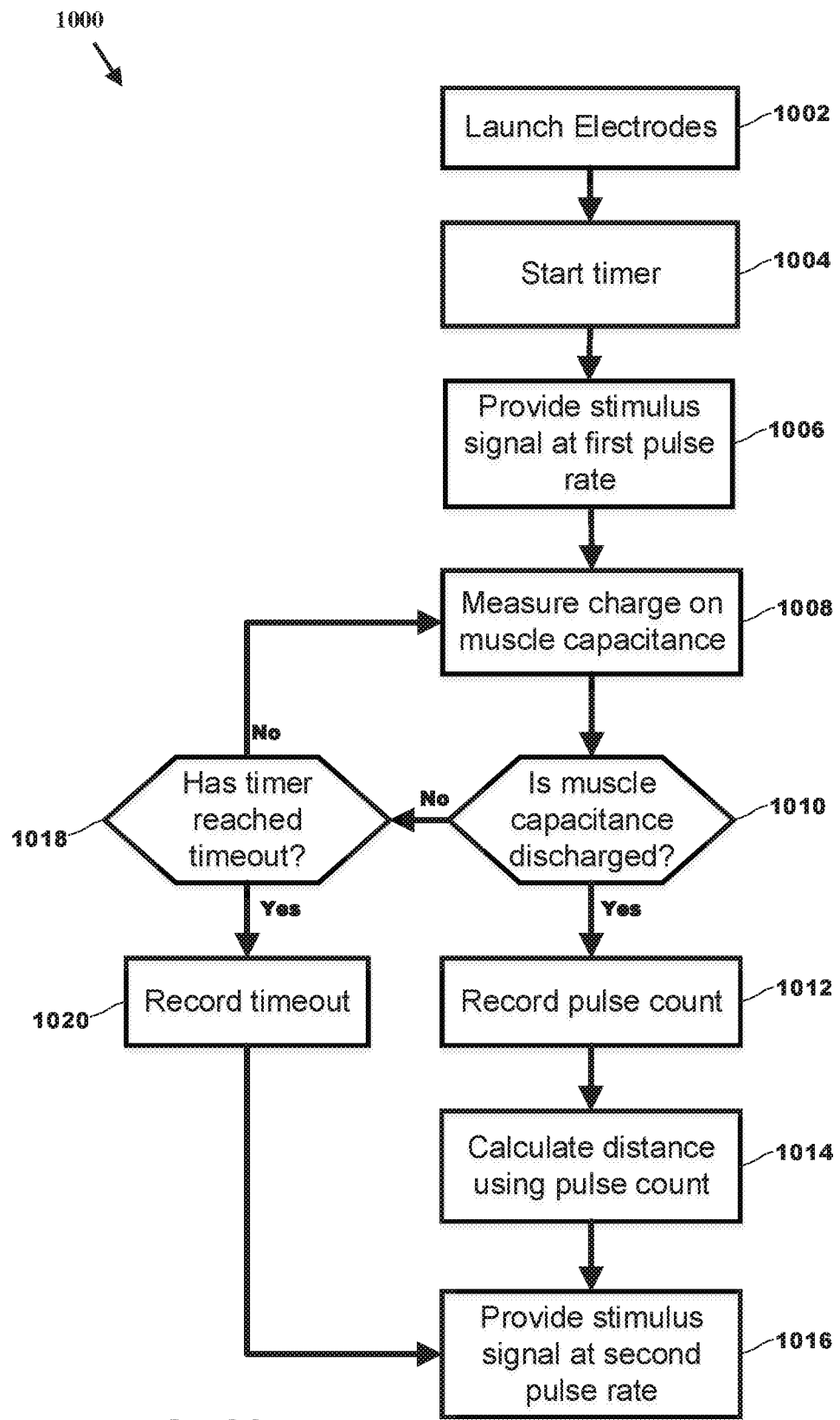
FIG. 10 is a flow chart of a method for detecting a distance between a CEW and a target according to various aspects of the present disclosure.

Processing circuit 136 of CEW 200 may perform, in whole or part, method 1000 as shown in FIG. 10. Method 1000 includes launch 1002, start 1004, provide 1006, measure 1008, determine 1010, record 1012, calculate 1014, provide 1016, determine 1018, and record 1020.

In launch 1002, processing circuit 136 instructs launch generator 134 to provide launch signal 150 to propulsion system 116. Launch 1002 initiates the launch of electrodes 310 and 320 toward a target. Execution moves to start 1004.

In start 1004, processing circuit 136 begins to count the number of times pulses are formed in (e.g., provided by) ionization signal 620, 720 or 820. Execution moves to provide 1006.

In provide 1006, processing circuit 136 provides each pulse of a stimulus signal by charging capacitance 530 and discharging capacitance 530 at a first pulse rate. Processing circuit 136 further controls switched power supply 510 and switch 560 to charge and discharge capacitance 530. In the event that capacitance 520 and 522 discharge shortly after launch, as discussed above, processing circuit 136 may recharge them. Execution moves to measure 1008.

In measure 1008, processing circuit 136 measures the magnitude of the voltage across capacitance 520 (node VMP). The magnitude of the voltage across capacitance 520 indicates the charge of capacitance 520. Execution moves to determine 1010.

In determine 1010, processing circuit 136 determines if capacitance 520 has discharged. If the voltage and/or charge on capacitance 520 is zero, close to zero, or less than the magnitude of voltage V612 or V614 when capacitance 520 is charged, then electrodes 310 and 320 likely have established a circuit with a target. Processing circuit may ignore the discharge of capacitance 520 shortly after launch for the reasons discussed above. If capacitance 520 appears to have been discharged, execution moves to record 1012. Otherwise, execution moves to determine 1018.

In record 1012, processing circuit 136 records the count of the number of pulses formed since start 1004. In record 1012, processing circuit 136 stores in memory the quantity of the count of pulses. Processing circuit 136 may further store the rate at which the pulses were provided. Processing circuit 136 may further store information such as current date and time (e.g., a timestamp), the magnitude of the voltages (e.g., V614, V624). Execution moves to calculate 1014.

In calculate 1014, processing circuit 136 uses information stored in memory and measured to calculate the distance between CEW 200 and target 350 as discussed above. Processing circuit 136 may convert the number of pulses counted into a distance traveled by electrodes 310 and 320. Processing circuit 136 may use the distance traveled to determine a distance (e.g., spread) between electrodes 310 and 320 at the target as discussed above. Processing circuit 136 may store any calculated information or information used to calculate information in the memory for storage. Information may be stored with a timestamp. Execution moves to provide 1016.

In provide 1016, processing circuit 136 provides the stimulus signal at the lower pulse rate (e.g., second rate) and higher voltages as discussed above. No step is shown beyond provide 1016; however, other steps to perform other functions follow.

In determine 1018, processing circuit 136 determines whether a predetermined timeout has occurred. If processing circuit 136 does not detect the discharge of capacitance 520, as discussed above, processing circuit 136 continues to provide pulses at a higher pulse rate and a lower voltage until expiration of the predetermined period of time. If the predetermined period, as tracked by a timer, is not expired, execution moves to measure 1008. If the predetermined period of time has not lapsed, execution moves to record 1020.

In record 1020, processing circuit 136 stores in memory the fact that the predetermined amount of time expired without detecting the discharge of capacitance 520. The expiration of the predetermined amount of time may be record with other data such as date and time.

Further embodiments of the disclosure are provided below.

A conducted electrical weapon ("CEW") for determining a distance between the CEW and a human or animal target, the CEW comprising: a processing circuit; a signal generator; and at least two wire-tethered electrodes; wherein: upon launch of the at least two wire-tethered electrodes toward the target, the signal generator provides a first series of current pulses at a first pulse rate; the processing circuit counts each current pulse of the first series to determine a number of current pulses of the first series; upon detecting that the at least two wire-tethered electrodes have established a circuit through the target, the signal generator provides a second series of current pulses at a second pulse rate, the second pulse rate is less than the first pulse rate, the second series for impeding locomotion of the target; and in accordance with the number of current pulses of the first series, the processing circuit determines the distance between the CEW and the target.

The conducted electrical weapon discussed above wherein the processing circuit multiplies a number of feet traveled by one of the at least two wire-tethered electrodes per each pulse provided at the first pulse rate by the number of current pulses of the first series to determine the distance between the CEW and the target.

The conducted electrical weapon discussed above wherein the processing circuit divides a velocity of flight of one of the at least two wire-tethered electrodes by the number of current pulses provided per second at the first pulse rate to determine the number of feet traveled by the at least two wire-tethered electrodes per each pulse provided at the first pulse rate.

A method for determining a distance between a conducted electrical weapon ("CEW") and a human or animal target, the method performed by the CEW, the method comprising: launching a wire-tethered electrode toward the target, the wire-tethered electrode for providing a stimulus signal to the target to impede locomotion of the target; measuring a duration of time from the launch until establishing a circuit between the wire-tethered electrode and the target; and in accordance with measuring, determining a distance between the CEW and the target.

The method discussed above wherein launching comprises providing a launch signal to ignite a pyrotechnic to launch the wire-tethered electrode.

The method discussed above wherein measuring comprises: starting measurement of the duration of time at about an occurrence of a launch signal; and stopping measurement of the duration of time upon detecting discharge of a muscle capacitance.

The method discussed above wherein determining a distance comprises multiplying the duration of time and a velocity of flight of the wire-tethered electrode.

A method for determining a distance between two electrodes positioned at or near a human or animal target, the two electrodes launched from a conducted electrical weapon ("CEW") toward the target, the method comprising: counting a number of pulses of a stimulus signal between launch of the electrodes toward the target and establishing an electrical circuit through the target via the electrodes; determining a first distance between the CEW and the target in accordance with the number of pulses counted; and calculating a second distance between the electrodes in accordance with the first distance.

The foregoing description discusses embodiments, which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

What is claimed is:

1. A method for determining a distance between a conducted electrical weapon ("CEW") and a human or animal target, the method performed by the CEW, the method comprising:
   providing a stimulus signal via at least one wire-tethered electrode at a pulse rate, the stimulus signal for impeding locomotion of the target;
   counting a number of pulses provided prior to establishing a circuit between the at least one wire-tethered electrode and the target; and
   in accordance with counting, determining the distance between the CEW and the target.

2. The method of claim 1 wherein providing the stimulus signal comprises charging a capacitance and discharging the capacitance into a primary winding of a transformer at the pulse rate.

3. The method of claim 1 wherein providing the stimulus signal comprises:

providing the stimulus signal at a first pulse rate prior to establishing the circuit between the at least one wire-tethered electrode and the target; and providing the stimulus signal at a second pulse rate after establishing the circuit between the at least one wire-tethered electrode and the target.

4. The method of claim 3 wherein the first pulse rate is greater than the second pulse rate.

5. The method of claim 3 wherein counting comprises counting the number of pulses provided at the first pulse rate.

6. The method of claim 1 wherein determining the distance comprises multiplying the number of pulses counted by a second distance traveled by the at least one wire-tethered electrode for each pulse of the number of pulses counted.

7. A method for determining a distance between a conducted electrical weapon ("CEW") and a human or animal target, the method performed by the CEW, the method comprising:
  prior to detecting a circuit between the CEW and the target:
    providing pulses of current at a first pulse rate; and
    counting a number of the pulses of current provided at the first pulse rate; and
  after detecting the circuit between the CEW and the target:
    providing pulses of current at a second pulse rate, the second pulse rate less than the first pulse rate, the pulses of current at the second pulse rate for impeding locomotion of the target; and
    determining, in accordance with the number of the pulses counted at the first pulse rate, the distance between the CEW and the target.

8. The method of claim 7 wherein providing the pulses of current at the first pulse rate and providing the pulses of current at the second pulse rate comprises:
  charging a capacitance; and
  discharging the capacitance into a primary winding of a transformer.

9. The method of claim 8 wherein:
  providing the pulses of current at the first pulse rate comprises charging the capacitance to a first voltage;
  providing the pulses of current at the second pulse rate comprises charging the capacitance to a second voltage; and
  the second voltage is greater than the first voltage.

10. The method of claim 7 wherein:
  providing the pulses of current at the first pulse rate comprises:
    charging a first capacitance to a first voltage;
    charging a second capacitance to a second voltage; and
    discharging the first capacitance into a primary winding of a transformer; and
  detecting the circuit comprises detecting a discharge of the second capacitance.

11. The method of claim 10 wherein detecting the circuit comprises detecting the discharge of the second capacitance after lapse of a duration of time.

12. A method for determining a distance between a conducted electrical weapon ("CEW") and a human or animal target, the method performed by the CEW, the method comprising:
  repeating at a first frequency:
    charging a first capacitance to a first voltage;
    charging a second capacitance to a second voltage;
    discharging the second capacitance into a primary winding of a transformer to provide a pulse of current; and
    counting each discharge of the second capacitance; and
  upon detecting discharge of the first capacitance:
    stopping counting each discharge of the second capacitance thereby determining a number of discharges of the second capacitance prior to detecting discharge of the first capacitance; and
    determining the distance between the CEW and the target by multiplying the number of discharges by a distance traveled by a wire-tethered electrode for each period of the first frequency, the wire-tethered electrode launched from the CEW.

13. The method of claim 12, further comprising, upon detecting the discharge of the first capacitance,
  repeating at a second frequency:
    charging the first capacitance to a third voltage;
    charging the second capacitance to a fourth voltage;
    discharging the second capacitance into the primary winding of the transformer to provide a second pulse of current; and
    discharging the first capacitance through a circuit formed through the target, wherein discharging the first capacitance through the target impedes locomotion of the target.

14. The method of claim 13 wherein the first frequency is greater than the second frequency.

15. The method of claim 12 wherein the first voltage is greater than the second voltage.

16. The method of claim 12 wherein the distance traveled by the wire-tethered electrode for each period of the first frequency is a velocity of the wire-tethered electrode divided by the first frequency.

17. The method of claim 16 wherein the velocity of the wire-tethered electrode launched from the CEW is between 100 and 200 feet per second.

18. The method of claim 16 wherein the first frequency is between 20 and 220 cycles per second.

19. The method of claim 17 wherein the first frequency is between 20 and 220 cycles per second.

20. The method of claim 12 wherein detecting the discharge of the first capacitance comprises:
  detecting the discharge of the first capacitance after lapse of a period of time after launch of the wire-tethered electrode.

* * * * *